Figure 1:
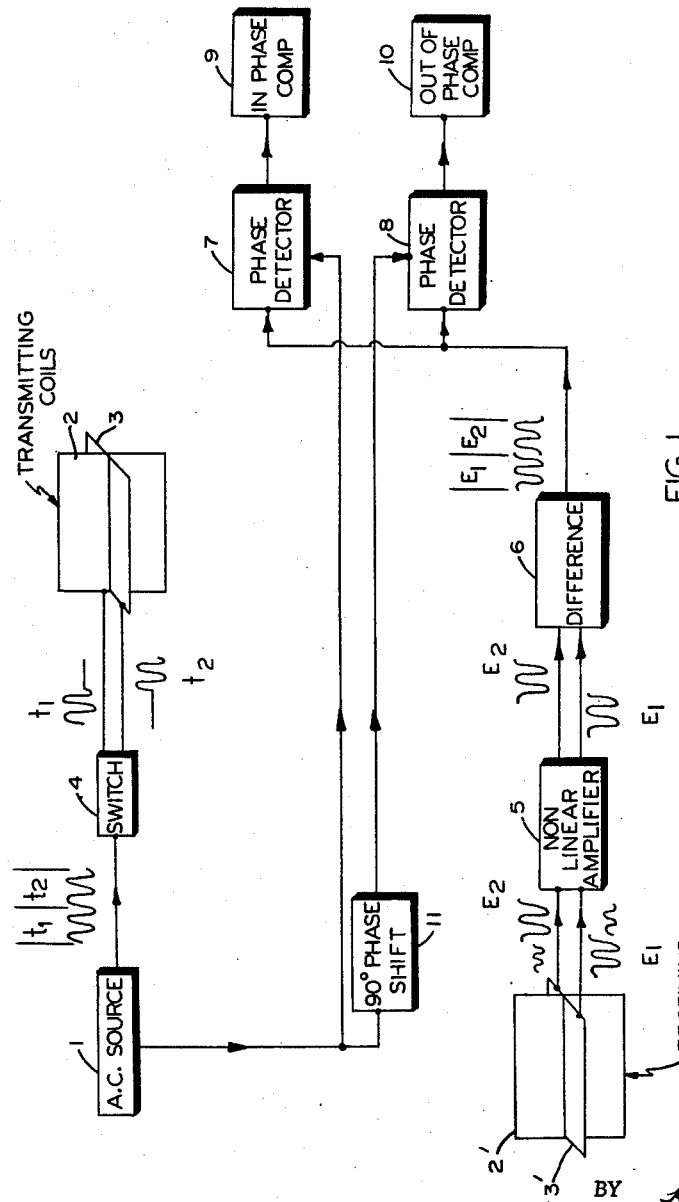

April 5, 1960  M. PURANEN  2,931,973
ELECTROMAGNETIC EXPLORATION METHOD
Filed Oct. 24, 1957  2 Sheets-Sheet 1

Maunu Puranen
INVENTOR.

BY Harold G. Fox
PATENT AGENT

United States Patent Office 2,931,973
Patented Apr. 5, 1960

2,931,973

ELECTROMAGNETIC EXPLORATION METHOD

Maunu Puranen, Helsinki, Finland, assignor to Canadian Airborne Geophysics Limited, Toronto, Ontario, Canada Application October 24, 1957, Serial No. 692,175

15 Claims. (Cl. 324—6)

Several electromagnetic methods of exploration from airplanes (or helicopters) are at present in use. Electromagnetic measurements carried out from aircraft are employed in ore prospecting and in investigating the geological structure of the earth's crust. The invention herein described is a new method, which is particularly well adapted to measurements carried out from the air but can also be used in explorations on the ground.

The instruments comprising the invention include a transmitting system for the creation of electromagnetic waves and a receiving system for the measurement of the wave field toward verifying changes in the field induced either by ores or other conductive formations. The basic idea according to the invention comprises at the place of transmission the creation of two alternating electromagnetic fields of the same frequency and phase but separate in time (or, in other words, successive series of waves) by feeding an alternating current in turn at short intervals into two transmitting coils situated at right angles to each other and that the signals created by the foregoing alternating, perpendicularly situated fields in two receiving coils are compared with each other. Ores and other conductive formations react in different ways to the differently oriented fields created and this difference can be measured and recorded.

In accordance with the invention, either the in-phase or the out-of-phase components of the received voltages—that is, the components that are in phase or 90° out of phase with the transmitted voltages—may be compared. Also, voltages corresponding to the transmitted voltages may be compared with the received voltages, before comparison of the latter, in order to eliminate the effect of direct radiation or induction between the transmitting and receiving coils.

The invention will now be more fully described in conjunction with the accompanying drawings showing preferred embodiments thereof.

Figure 2:
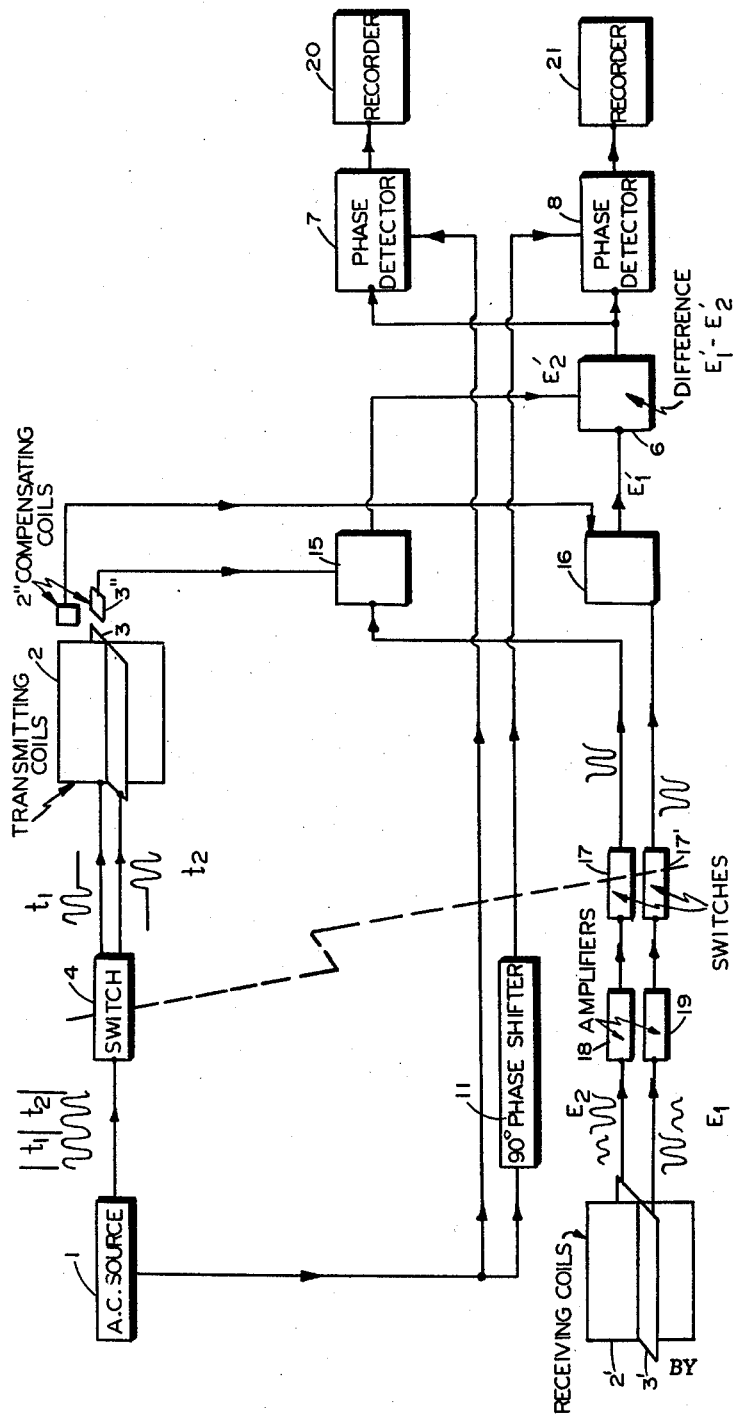

In the drawings,

Fig. 1 is a schematic diagram of one embodiment of the invention, with the elements thereof shown in block form; and, Fig. 2 is a schematic diagram, similar to Fig. 1, of a second embodiment of the invention.

Referring first to Fig. 1, the apparatus of the invention includes a transmitting system and a receiving system.

The transmitting system includes a source of alternating current 1, which may be a rotating generator, tube oscillator or transistor oscillator. A suitable frequency, depending on the geological circumstances, might be, for instance, between 0.1–10 kc./sec. In addition, the transmitting system includes two intersecting transmitting coils 2 and 3, preferably situated at right angles to each other. Proceeding in accordance with the invention, the current is fed from the alternating current source alternately, by switch 4 into transmitting coils 2 and 3 for a relatively short period at a time, which period might be called operating time interval $t$. The current is fed, for instance, for the time $t_1$ first into coil 2 and then for time $t_2$ into coil 3, while coil 2 is currentless, then to coil 2 again for $t_3$ while coil 2 is currentless, etc. If coil 2 is horizontal (its axis vertical), it creates below it a vertical magnetic alternating field during every other operating time intreval ($t_1$, $t_3$ . . .). Coil 3 is in this case vertical (axis horizontal) and it creates below it a horizontal magnetic field during every other operating time interval ($t_2$, $t_4$ . . .).

The receiving system also comprises two coils, 2' and 3', situated at right angles to each other. The simplest measurement system is obtained when receiving coil 2' is placed on the same geometrical plane as transmitting coil 2 and, likewise, receiving coil 3' on the same geometrical plane as transmitting coil 3. In flying, the pair of transmitting coils might be in the aircraft, while the pair of receiving coils might be placed either in a streamlined case towed by the airplane at the end of a cable or then in a different aircraft (or in a case towed by the latter), which is flown at an appropriate distance from the former.

When the transmitting and receiving coils are thus paired, on the same plane, it is evident that the field of transmitting coil 2 affects only receiving coil 2' and, correspondingly, the field of transmitting coil 3 only receiving coil 3'. During the first operating interval $t_1$, when the alternating current is fed into transmitting coil 2, voltage is generated only in receiving coil 2', the other receiving coil remaining tensionless. During the second operating interval $t_2$, voltage is generated correspondingly only in receiving coil 3'. If the transmitting coils are electromagnetically identical, one with the other, and the receiving coils likewise, between themselves, the voltages $E_1$ and $E_2$ generated in receiving coils 2' and 3' at successive time intervals are of equal magnitude, that is, the difference between $E_1$ and $E_2$ is zero. The voltage difference $E_1-E_2$ remains zero, even if the distance between the pair of transmitting and receiving coils is changed, for the magnetic alternating fields induced by the transmitting coils change according to the same law of distance (inversely proportional to the distance in the third power). It is also observed that the strength of signals $E_1$ and $E_2$ changes only very slowly upon tilting the receiving coils in different directions, for it is in the initial position of the receiving coils that signals $E_1$ and $E_2$ attain their maximum value, and the maximum value is reduced slowly according to the cosine law as a function of the angle of tilt. If, finally, the pair of receiving coils is turned around the axis of intersection between the coils, then the difference $E_1-E_2$ remains zero, for both $E_1$ and $E_2$ weaken according to the same cosine law as a function of the angle of torsion. The condition of the last conclusion is that $E_1$ is expressly the alternating voltage induced in receiving coil 2' during the first (third, fifth, etc.) operating interval, without any signal induced during the even-number intervals mixing in. Upon a pair of coils being turned, receiving coil 2' begins to be affected by a certain component created by the field of transmitting coil 3 during the operating interval of the other; this component is, to be sure, small when the angle of torsion is small. This small component nevertheless causes errors in measurement, as it changes rapidly, i.e. according to the sine law, as a function of the angle of torsion. Thus the "error voltage" induced during the second (fourth, sixth, etc.) operating interval in receiving coil 2' must be left wholly unamplified or its influence on the measurements must be otherwise prevented. Correspondingly, the voltage generated in receiving coil 3' must be amplified and measured only during the second, fourth, etc., operating intervals and left totally unamplified during the intervals in between.

A strong signal is induced into receiving coil 2' during operating interval $t_1$ and a weak signal during the succeeding interval $t_2$ (being at absolute zero unless there are errors in the position of the coils). Amplication of the weak "false signal" induced during interval $t_2$ may be eliminated by employing a non-linear amplifier 5 having a channel for each of the signals, which amplifier does not react in the least to weak signals but nevertheless amplifies the strong signal induced during interval $t_1$. If necessary, a non-linear amplifier may be created in well-known ways, as, e.g., by appropriately selecting the operating point of a tube. In the event that a non-linear amplifier is not desired, the following procedure would also serve. During operating interval $t_2$ a strong signal is induced in receiving coil 3' and amplified by its amplifier channel. Part of this signal can be rectified and then be used as a control signal (as, e.g., a grid voltage) for turning off the amplifier channel connected to coil 2'. Everything that has been said in the foregoing about coil 2' may be easily applied inversely to coil 3'.

In the foregoing it has been assumed that each interval $t$ contains a lengthy series of waves, as, for instance, 10–1,000 waves or alternating current periods. Since the amplitude of the oscillations of a tuned circuit immediately falls to zero upon the supply current's ceasing, care must be taken that the length of the time of rising and falling of the current is rather small compared to the total operating interval $t$.

It is also possible to reduce the operating interval $t$ to the extent that it would comprise only a half-wave of the alternating current used. Thus it would be easy to supply from the transmitter by means of a rectifier, e.g., positive half-waves into transmitting coil 2 and negative half-waves into transmitting coil 3.

By employing the aforedescribed methods, signal $E_1$ would be obtained from receiving coil 2' (or from its amplifier) during operating intervals $t_1$, $t_3$, etc., and signal $E_2$ from receiving coil 3' (or its amplifier) during operating intervals $t_2$, $t_3$, etc. In the event that there are no ores or other conductive formations in the environment, signals $E_1$ and $E_2$ are of equal magnitude and the difference $E_1-E_2$ is zero, and the difference remains zero, practically considered, regardless of changes in the distance between the pair of transmitting and receiving coils and slight changes in tilt and the torsional angle. Such changes in distance and angle occur in practise, for example, when the receiving coils are towed at the end of a cable behind the aircraft.

The next problem is measuring the difference between the temporally alternating sine wave series $E_1$ and $E_2$ in respect to both the amplitude and the phase of the signals. Known methods may be used in solving the problem. The difference in amplitudes may be measured by combining the signals in opposite phase in difference circuit 6 and then, e.g., by rectifying the combined signal and conducting the direct current impulses (obtained of the length of interval $t$) with opposite signs into a direct current indicator whose time constant is long compared to time $t$. Thereupon the indicator will not be able to follow the individual direct current impulses of the length of time $t$ but will record only the difference between them, with the result that the reading of the indicator is proportional to the difference between the amplitudes of signals $E_1$ and $E_2$. Alternatively, the two signals could be separately rectified and the resulting direct current impulses subtracted in such an indicator.

Another measuring method would be to conduct signals representing the difference between voltages $E_1$ and $E_2$ into phase detectors 7 and 8, which would divide the difference $E_1-E_2$ into real (or in-phase) and imaginary (or out-of-phase) components; these would then be recorded by means of two relatively slow indicators 9 and 10 (the time constant of the indicators being long compared to the operating interval $t$). The alternating voltage of the transmitter may be used as the reference voltage in the phase detector, for dividing the $E_1-E_2$ into components, that voltage being supplied directly to in-phase detector 7 and through a 90° phase shift circuit 11 to out-of-phase detector 8. The voltage (or the same phased alternating voltage) of either receiving coil is also suitable as a reference voltage. In that case a joining cable is not necessarily required between the transmission and receiving systems. The phase difference between signals $E_1$ and $E_2$ can also be measured with known types of phase difference meters. In practice it is all the same whether the real and imaginary component of the difference signal $E_1-E_2$ or the difference between the amplitudes and phases of signals $E_1$ and $E_2$ is measured.

In the measuring techniques described in the foregoing, strong signals of nearly opposite phase are conducted into the phase detector (rectifier, etc.) successively at time intervals $t$. If the phase detector be wholly linear, it nevertheless accurately measures the components even of strong signals. Fig. 2 shows a system for improvement of measuring accuracy, in which, in connection with the transmitting coils and in relation to them, firmly installed compensation coils 2" and 3" are mounted parallel to the corresponding transmitting coils 2 and 3. The voltage induced in compensation coil 2" is proportional to the current in transmitting coil 2 during intervals $t_1$, $t_3$, etc., and at other times zero, while the voltage induced in compensation coil 3" is proportional to the current in transmitting coil 3 during intervals $t_2$, $t_4$, etc., and at other times zero. By means of voltages induced in said compensation coils the signals $E_1$ and $E_2$ are separately compensated nearly to zero, by comparison of these signals with the compensation voltages in compensation circuits 15 and 16 before the signals are conducted into the difference network 6.

The problem of eliminating error voltages resulting from voltages induced in the receiving coils when their corresponding transmitting coils are not conducting current may be solved by applying either mechanical or electronic methods. In principle, the simplest method is, e.g., a mechanical switch system (relay apparatus or revolving switches), including switch 4 in the transmitting circuit and mechanically-connected switches 17 and 17' electrically connected between compensation circuits 15, 16 and the corresponding amplifiers 18, 19. This switch system always simultaneously switches in transmitting coil 2 and amplifier 19 (or receiving coil 2') at operating intervals $t_1$, $t_3$, $t_5$, etc., and correspondingly transmitting coil 3 and amplifier 18 at operating intervals $t_2$, $t_4$, $t_6$, etc.

By using tube (or transistor) transmitters and receivers, the same problem may be solved, for instance, as follows. The tube transmitter is constructed of two parts, a regular, continuously operating oscillator and, after it, two separate power amplifiers, one of which operates during intervals $t_1$, $t_3$, etc., feeding alternating current into transmitting coil 2 and the other, again, at intervals $t_2$, $t_4$, etc., feeding alternating current into transmitting coil 3. The power amplifiers can be easily put into operation and turned off by changing the operating point, e.g., the grid voltage of some tube in the amplifier. This grid voltage controlling the power amplifiers at intervals $t$ may be taken from a separate low frequency auxiliary oscillator. The operating interval $t$ can be fixed, if desired, as a specific multiple of the period of the alternating current fed into the transmitting coils. The signals coming from receiving coils 2' and 3' are amplified by two separate tube amplifiers (or transistor amplifiers). It is evident that these amplifiers may be put into operation and turned off quite in the same way and synchronously with the corresponding transmitting coils by using in their control the control voltage drawn from the same low frequency auxiliary oscillator.

The remaining elements of Fig. 2 may be identical with the corresponding elements of Fig. 1 and so are identified by the same reference numerals. However, appropriate recorders 20 and 21 may be substituted for the indicators 9 and 10.

Only one way of arranging a coil system is depicted in the foregoing (transmitting and receiving coils 2 and 2' on the same geometrical plane and coils 3 and 3' correspondingly). It is, however, evident that the invention herein described may be applied to other coil positions as well; but since they do not involve anything new in principle, there is no purpose to be served by describing them in this connection.

For the sake of simplicity, it has been assumed in the foregoing that the successive operating intervals $t_1$, $t_2$, $t_3$ . . . follow upon each other immediately and are of equal duration. This, naturally, is not imperative. Between operating intervals $t_1$, $t_2$, $t_3$, etc., it would be possible, e. g., to leave equally long "dead" spaces, during which no current would be fed into either transmitting coil. Likewise, every other operating interval could be doubled in length, provided that simultaneously the strength of the corresponding transmitting coil current is cut in half, and so on. As required, successive series of waves could also be conducted into more than two coils. Such self-evident variations belong, of course, within the scope of the invention herein presented.

What I claim as my invention is:

1. Apparatus for electromagnetic exploration comprising a source of alternating current, two transmitting coils disposed at right angles to each other, two receiving coils disposed at right angles to each other, means for supplying current from said source to said transmitting coils alternately, and at predetermined intervals, and means for measuring and recording the difference between the signals induced in the two receiving coils at corresponding operative intervals.

2. Apparatus as claimed in claim 1 wherein one receiving coil and one transmitting coil are in the same plane and wherein the second receiving coil and the second transmitting coil are in the same plane.

3. Apparatus for electromagnetic exploration comprising a source of alternating current, two transmitting coils disposed at right angles to each other, two receiving coils disposed at right angles to each other, means for supplying current from said source to said transmitting coils alternately, and at predetermined intervals, and means for measuring and recording the difference between the signals induced in the two receiving coils at corresponding operative intervals, said predetermined intervals being sufficiently long to permit the transmission of a significant number of wave cycles, but short in relation to the time constant of the receiving and recording system whereby the recorder records the statistical mean of signals over a plurality of operating intervals.

4. Apparatus as claimed in claim 3 wherein said predetermined interval is sufficiently long to permit the transmission of from 10 to 1,000 wave cycles.

5. Apparatus for electromagnetic exploration comprising a source of alternating current, two transmitting coils disposed at right angles to each other, two receiving coils disposed at right angles to each other, means for supplying current from said source to said transmitting coils alternately, and at predetermined intervals, and means for measuring and recording the difference between the signals induced in the two receiving coils at corresponding operative intervals, said intervals being equal to the length of one-half of the alternating current wave length whereby half waves of the alternating current are alternately fed into the transmitting coils.

6. Apparatus for electromagnetic exploration comprising a source of alternating current, two transmitting coils disposed at right angles to each other, two receiving coils disposed at right angles to each other, means including mechanically operable switching means adapted to supply current from said source to said transmitting coils alternately and at predetermined intervals and adapted, when current is supplied to one transmitting coil, simultaneously to amplify and record the signal induced in one receiving coil while ignoring the signal induced in the other receiving coil, and when current is supplied to the other transmitting coil simultaneously to amplify and record the signal induced in the other receiving coil while ignoring the signal induced in said one receiving coil.

7. The method of electromagnetic prospecting which comprises setting up a first intermittent alternating magnetic field, setting up a second alternating magnetic field at right angles to said first alternating magnetic field in the intervals between said first field, said first and second alternating magnetic fields being of the same phase, frequency and magnitude, and recording the difference between the signals induced in two mutually perpendicular receiving coils at corresponding operative intervals.

8. Apparatus for electromagnetic exploration comprising a source of alternating current, a pair of transmitting coils disposed at right angles to each other, a pair of receiving coils disposed at right angles to each other and spaced from the transmitting coils, means for connecting said source alternately to one and the other of said transmitting coils, means for detecting the difference between the receiving coil voltages, a pair of signal channels connecting said receiving coils to said detecting means, and means for alternately disabling said channels synchronously with the alternate connecting operation of said connecting means.

9. The apparatus of claim 8 in which said transmitting and receiving coils are aligned with one transmitting coil approximately parallel to one receiving coil, and in which said connecting means connects said one transmitting coil to said source at the same time the signal channel connected to the other receiving coil is disabled.

10. The apparatus of claim 9 in which said disabling means includes a pair of switches each connected in a different one of said signal channels, and said connecting means includes a third switch connected between said source and said transmitting coils, said pair of switches and said third switch being mechanically ganged together.

11. Apparatus for electromagnetic exploration comprising a source of alternating current, a pair of transmitting coils disposed at right angles to each other, a pair of receiving coils disposed at right angles to each other and aligned with and spaced from the transmitting coils with corresponding transmitting and receiving coils approximately parallel, whereby the voltage induced in each receiving coil by current in the corresponding transmitting coil is very much greater than the voltage due to current in the other transmitting coil, means for connecting said source alternately to one and the other of said transmitting coils, means for detecting the difference between the receiving coil voltages, and means connected between the receiving coils and said detecting means operable to substantially eliminate the effect of the very much lower voltage in each receiving coil developed during current flow in said other transmitting coil.

12. The apparatus of claim 11 in which said last-named means is a non-linear amplifier operable to amplify large amplitude signals to a very much greater extent than small amplitude signals.

13. The apparatus of claim 1 in which said last-named means includes phase-detection means for separating the components of the receiving coil voltages which are in phase with the transmitting coil voltages from those which are 90° out of phase with the transmitting coil voltages before recording the difference in magnitude of said voltages.

14. The apparatus of claim 13 having in-phase and out-of-phase recorders for recording the difference in amplitudes of the corresponding voltages.

15. The apparatus of claim 1 including a pair of compensating coils disposed respectively parallel to the transmitting coils, and means for connecting the compensating coils differentially with the corresponding receiving coils, said last-named means having its output connected to said measuring and recording means.

References Cited in the file of this patent

UNITED STATES PATENTS

| | | |
|---|---|---|
| 2,623,924 | Cartier | Dec. 30, 1952 |
| 2,794,949 | Hedstrom | June 4, 1957 |
| 2,887,650 | Ruddock et al. | May 19, 1959 |